United States Patent [19]

Selby et al.

[11] 3,878,071

[45] Apr. 15, 1975

[54] COPPER EXTRACTION

[76] Inventors: John Harold Selby, 21 Zaymel Gardens, Duchess Ave., Windsor Park, Randburg, Transvaal; George Stephen James, 5 13th Ave., Parktown North, Johannesburg, Transvaal, both of South Africa

[22] Filed: July 17, 1973

[21] Appl. No.: 379,968

[30] Foreign Application Priority Data
July 18, 1972 South Africa.................. 72/4933

[52] U.S. Cl. ............... 204/92; 204/93; 204/108; 423/34; 423/36
[51] Int. Cl. ... C01b 17/00; C01b 17/96; C01g 3/00
[58] Field of Search................... 204/92, 93, 108

[56] References Cited
UNITED STATES PATENTS

| | | | |
|---|---|---|---|
| 777,669 | 12/1904 | Frank............................ | 204/92 |
| 885,622 | 4/1908 | Jumau............................ | 204/108 |
| 1,119,477 | 12/1914 | Van Arsdale..................... | 204/92 |

*Primary Examiner*—John H. Mack
*Assistant Examiner*—Aaron Weisstuch

[57] ABSTRACT

A process of precipitating Chevreul salt from a solution comprising copper dissolved in sulphurous acid including the steps of contacting the solution with a pair of electrodes, the anode preferably being copper, and applying a potential difference across the electrodes effective to cause precipitation of the Chevreul salt. The potential difference is preferably such that the cathode potential is between a few millivolts and about 250 millivolts. The copper containing solution is preferably a copper rich leach solution resulting from the sulphurous acid leaching of a copper-containing oxidic ore.

19 Claims, No Drawings

COPPER EXTRACTION

This invention relates to the extraction of copper from copper containing materials, particularly copper containing oxidic ores.

The copper values from copper-containing oxidic ores may be leached using any one of a number of known leach solutions. Sulphuric and sulphurous acid solutions are two examples of such leach solutions. A sulphurous acid leach solution has the particular advantage over a sulphuric acid leach solution that much less gangue material is leached.

The leaching of copper-containing oxidic ores with sulphurous acid involves the slurrying of finely ground ore with water, passing a stream of sulphur dioxide through the slurry to form the sulphurous acid in situ, and separating the copper-rich leach solution from the ore. The copper is then recovered from the leach solution by precipitating it in the form of Chevreul salt (Cu (Cu $SO_3$)$_2$.2$H_2O$). In the past Chevreul salt has been precipitated from such leach solutions in a number of ways, e.g., nitrogen, vacuum, steam or pressure stripping or by the addition of powdered copper to the solutions. The disadvantages of these methods are that there are high sulphur losses due to oxidation to sulphate; high circulating loads of copper; impracticability of obtaining vacuum conditions in corrosive gaseous atmospheres; and high energy consumptions.

It is an object of the present invention to provide another method of precipitating Chevreul salt from a solution comprising copper dissolved in sulphurous acid.

According to the invention, there is provided a process of precipitating Chevreul salt from a solution comprising copper dissolved in sulphurous acid including the step of contacting the solution with a pair of electrodes and applying a potential difference across the electrodes effective to cause precipitation of the Chevreul salt.

It has been found that the Chevreul salt precipitates mainly in the region of the cathode, although some precipitation does occur in the region of the anode. The precipitated salt may be recovered from the solution by filtering, centrifuging or other conventional method.

The potential difference applied across the electrodes must be such as to cause precipitation of Chevreul salt. This means that the potential is such as to ensure that the cathode potential is lower than that at which sulphide ions will be produced by electrolysis in the solution. The actual potential applied in any particular case will vary according to factors such as concentration of copper in the solution, and the temperature and pH of the solution. The selection of an applied potential for any particular set of conditions is however well within the skills of one skilled in the art.

The potential applied across the electrodes is preferably such that the cathode potential with respect to a standard saturated calomel electrode is in the range from a few millivolts to about 250 millivolts.

Sulphur dioxide is generated during the precipitation of the Chevreul salt. This makes the process particularly attractive in the sulphurous acid leaching of copper-containing materials in that the sulphur dioxide gas generated can be used in the preparation of leach solution. Thus, according to another aspect of the invention, there is provided a process of extracting copper from a copper-containing material including the steps of leaching copper values from the material using a sulphurous acid leach solution, contacting the copper-rich leach solution with a pair of electrodes, and applying across the electrodes a potential difference effective to cause precipitation of copper in the form of Chevreul salt from the solution. The copper containing material is preferably a copper containing oxidic ore. Further, the sulphur dioxide generated during the precipitation of Chevreul salt is preferably used in the preparation of sulphurous acid leach solution. In practice, the sulphur dioxide will dissolve in the spent electrolyte so producing sulphurous acid in situ which can be recycled back to the leach stage.

The electrodes may, for example, be copper, platinum, graphite or the like electrodes. It is preferred, however, to have a copper anode as it has been found that such an anode reduces the tendency for oxidation of the sulphur to sulphate to occur. This, in turn, means that more sulphur dioxide is available for use in sulphurous acid leach solutions.

The concentration of copper in the solution will generally be in the range from 1 to 50 g/l. The preferred copper concentration is from 20 to 40 g/l.

The current and current density will be dependent on factors such as area of the electrodes, concentration of the solution and so on. It has been found preferable to effect periodic current reversal to reduce overvoltage problems.

A particular advantage of the invention is that Chevreul salt of high purity is obtained. There are well known techniques for recovering copper from Chevreul salt, e.g., the method given in Example 1. The higher the purity of the Chevreul salt the higher the purity of the recovered copper.

Embodiments of the invention will now be described.

EXAMPLE 1

A copper-containing oxidic ore from Zaire was finely ground and then slurred with water to produce a pulp density of 45%. Sulphur dioxide gas was passed through the slurry to form sulphurous acid in situ. Leaching was continued for about six hours during which time the sulphurous acid leach solution was maintained at about 10°C. Thereafter, the ore was filtered from the leach solution which comprised copper and other metals dissolved in sulphurous acid. The assay of the leach solution was as follows:

| | |
|---|---|
| Cu : 35 g/l | Co : 1,6 g/l |
| Ca : 2,3 g/l | Mg : 2,2 g/l |
| Fe : 1,0 g/l | S : 64 g/l |
| | pH : 1.5 |

Standard electrolysis apparatus was used to precipitate Chevreul salt from this solution. The apparatus consisted of a vessel into which the solution was placed and two electrodes which were connected to a conventional source of DC electrical power. Both electrodes were made of platinum. The electrodes were placed in the vessel in contact with the solution and an initial potential difference of 550 millivolts applied across them. The cathode potential was 50 millivolts measured against a standard saturated calomel electrode. The cathode potential was maintained at this value for 250 minutes during which time 96 percent of the copper had precipitated as Chevreul salt. The average current density was 8.6 A/m$^2$.

During the electrolysis the solution was stirred to minimise polarisation. Most of the Chevreul salt was found to have precipitated in the region of the cathode, but some of the salt precipitated in the region of the anode.

The Chevreul salt in the solution was recovered by filtration. Small quantities of salt collect on the electrodes and this may be recovered by scraping and washing the electrodes.

The Chevreul salt recovered had the following assay:

| Cu : 48,85% | Mg : 0,01% |
| Co : 0,02% | Fe : 0,09% |
| Ca : 0,06% | S : 16,0% |

The copper was recovered from this Chevreul salt by roasting the salt to produce copper oxide, dissolving the copper oxide in sulphuric acid and then electrowinning the copper in the conventional manner. Very pure copper was obtained and this was achieved because of the very pure Chevreul salt obtained by the electrolytic method described above.

During the electrolysis, sulphur dioxide was generated and this dissolved in the spent electrolyte thereby producing sulphurous acid which was available for recycling to the leach stage.

EXAMPLES 2 to 12

Using the same copper-rich leach solution as that of Example 1, experiments were carried out using different electrodes, cathode and cell voltages and current densities. The time of electrolysis was in each case about 250 minutes. The results of these experiments are given in Table I. The recovered Chevreul salt was analysed in each case and these analyses are given in Table I. It will be noted that the Chevreul salt was in each case extremely pure making it possible for very pure copper to be produced therefrom.

Furthermore, it will be noted from the last column that the power consumption (i.e. Kwh) per kg of copper recovered as Chevreul salt was very low even at relatively high current densities. This makes the process economically very attractive as the conversion of Chevreul salt to copper is relatively inexpensive.

following assay:

| Cu : 12 g/l | Co : 0,6 g/l |
| Ca : 3,5 g/l | Mg : 2,2 g/l |
| Fe : 0,4 g/l | S : 40,0 g/l |

Precipitation of Chevreul salt was achieved using the same apparatus and conditions as those specified in Example 1. A 95% recovery of the copper as Chevreul salt was achieved.

EXAMPLE 14

The spent electrolytes from the processes of examples 1 to 12 were analysed for sulphate concentration using the standard barium sulphate precipitation method. This analysis gave an indication of the sulphur oxidation during the electrolysis. The figure obtained in each case was converted into a weight of sulphur oxidised per ton of copper recovered from the solution. On this basis it was found that in the examples where a copper anode was used there was no sulphur oxidised per ton of copper recovered whereas in the case of examples 2 and 3 with platinum electrodes, 0.054 and 0.133 tons of sulphur, respectively, were oxidised per ton of copper recovered. It was found that using the low cathode potential of example 1, resulted in only a small amount of sulphur oxidation per ton of copper recovered.

We claim:

1. A process of precipitating Chevreul salt from a solution comprising copper dissolved in sulfurous acid including the steps of contacting the solution in an electrolytic cell with a pair of electrodes and applying a potential difference across the electrodes which is such that the cathode potential with respect to a standard saturated calomel electrode is in the range from a few millivolts to about 250 millivolts to cause precipitation of the Chevreul salt.

2. A process according to claim 1 wherein the anode is copper.

3. A process according to claim 1 wherein the anode is copper, and the cathode is selected from copper, platinum and graphite.

TABLE I.

| Example | Electrode Pair | Cathode Potential (v) w.r.t. Std. Sat. Calomel Electrode | Max. Cell Voltage (v) | Average Current Density (A/m²) | CONCENTRATION OF CONSTITUENTS (%) IN CHEVREUL SALT | | | | | | Power Consumption Kwh/kg Cu |
|---|---|---|---|---|---|---|---|---|---|---|---|
| | | | | | Cu | Co | Ca | Mg | Fe | S | |
| 2 | Pt+/Pt− | 0,10 | 1,30 | 62,4 | 48,75 | 0,02 | 0,06 | 0,01 | 0,09 | 16,0 | 0,70 |
| 3 | " | 0,15 | 2,40 | 12,70 | 48,60 | 0,03 | 0,05 | 0,01 | 0,08 | 15,8 | 2,19 |
| 4 | Cu+/Pt− | 0,05 | 0,70 | 2,7 | 48,60 | 0,03 | 0,09 | 0,01 | 0,12 | 16,24 | 0,11 |
| 5 | " | 0,10 | 2,0 | 49,5 | 49,48 | 0,03 | 0,12 | 0,01 | 0,25 | 17,02 | 0,85 |
| 6 | " | 0,15 | 3,2 | 113,0 | 49,48 | 0,03 | 0,10 | 0,01 | 0,15 | 15,75 | 2,23 |
| 7 | Cu+/Cu− | 0,10 | 0,83 | 72,1 | 50,04 | 0,03 | 0,45 | 0,01 | 0,31 | 15,30 | 0,69 |
| 8 | " | 0,15 | 1,45 | 161 | 47,95 | 0,02 | 0,11 | 0,01 | 0,11 | 16,83 | 1,55 |
| 9 | " | 0,20 | 1,70 | 167 | 48,16 | 0,02 | 1,32 | 0,01 | 0,24 | 13,86 | 2,13 |
| 10 | Cu+/C− (graphite) | 0,15 | 1,30 | 46,2 | 48,60 | 0,03 | 0,09 | 0,01 | 0,23 | 16,36 | 0,42 |
| 11 | " | 0,20 | 1,38 | 41,99 | 48,99 | 0,03 | 0,10 | 0,02 | 0,16 | 15,60 | 0,36 |
| 12 | " | 0,25 | 1,50 | 75,3 | 47,94 | 0,03 | 1,35 | 0,01 | 0,13 | 15,70 | 0,80 |

EXAMPLE 13

The same leaching procedure as in example 1 was adopted except that the pulp density of the slurry was 20% and a lesser amount of sulphur dioxide gas was used. The resulting copper-rich leach solution had the 4. A process according to claim 1 wherein the solution is a leach solution resulting from the sulphurous acid leaching of a copper-containing material.

5. A process according to claim 4 wherein the copper-containing material is a copper-containing oxidic ore.

6. A process according to claim 1 wherein the concentration of copper in the solution is in the range from 1 to 50 g/l.

7. A process according to claim 1 wherein the concentration of copper in the solution is in the range from 20 to 40 g/l.

8. A process of precipitating Chevreul salt from a solution comprising copper dissolved in sulphurous acid, the solution having a copper concentration in the range of from 1 to 50 g/l, including the steps of contacting the solution with a pair of electrodes, the anode being copper, and applying a potential difference across the electrodes such that the cathode potential with respect to a standard saturated calomel electrode is in the range from a few millivolts to about 250 millivolts thereby causing the copper to precipitate from the solution in the form of Chevreul salt.

9. A process of extracting copper from a copper-containing material including the steps of leaching copper values from the material using a sulphurous acid leach solution, contacting the copper-rich leach solution with a pair of electrodes, and applying across the electrodes a potential difference effective to cause precipitation from the solution of copper in the form of Chevreul salt.

10. A process according to claim 9 wherein sulphur dioxide generated during precipitation of the Chevreul salt is used in the preparation of sulphurous acid leach solution for the leach stage.

11. A process according to claim 9 wherein the copper-containing material is a copper-containing oxidic ore.

12. A process according to claim 9 wherein the anode is copper.

13. A process according to claim 9 wherein the anode is copper and the cathode is selected from copper, platinum and graphite.

14. A process according to claim 9 wherein the applied potential is such that the cathode potential with respect to a standard saturated calomel electrode is in the range from a few millivolts to about 250 millivolts.

15. A process according to claim 9 wherein the copper-rich leach solution has a copper concentration in the range of from 1 to 50 g/l.

16. A process according to claim 9 wherein the copper-rich leach solution has a copper concentration in the range of from 20 to 40 g/l.

17. A process for extracting copper from a copper-containing material including the steps of leaching copper values from the material using a sulphurous acid leach solution to produce a copper-rich leach solution having a copper concentration of in the range from 1 to 50g/l, contacting the copper-rich leach solution with a pair of electrodes, the anode being copper, applying a potential difference across the electrodes such that the cathode potential with respect to a saturated calomel electrode is in the range from a few millivolts to about 250 millivolts to cause precipitation from the solution of copper in the form of Chevreul salt, and recovering the copper from the Chevreul salt.

18. A process according to claim 17 wherein the copper-containing material is a copper-containing oxidic ore.

19. A process according to claim 18 wherein sulphur dioxide generated during the precipitation of Chevreul salt is used in the preparation of sulphurous acid leach solution for the leach stage.

* * * * *